(12) United States Patent
Jen et al.

(10) Patent No.: US 7,486,457 B2
(45) Date of Patent: Feb. 3, 2009

(54) METHOD AND APPARATUS FOR PREDICTING WRITE FAILURE RESULTING FROM FLYING HEIGHT MODULATION

(75) Inventors: David H. Jen, San Jose, CA (US); Mike Suk, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 1500 days.

(21) Appl. No.: 10/077,390

(22) Filed: Feb. 15, 2002

(65) Prior Publication Data

US 2003/0156340 A1 Aug. 21, 2003

(51) Int. Cl.
*G11B 27/36* (2006.01)
*G11B 5/02* (2006.01)

(52) U.S. Cl. .............................. 360/31; 360/25; 360/53; 360/75

(58) Field of Classification Search .................. 360/25, 360/31, 53, 60, 75
See application file for complete search history.

(56) References Cited

U.S. PATENT DOCUMENTS

| | | | |
|---|---|---|---|
| 5,159,513 A | 10/1992 | Dieny et al. | |
| 5,206,590 A | 4/1993 | Dieny et al. | |
| 5,751,510 A | 5/1998 | Smith et al. | |
| 5,777,815 A | 7/1998 | Kasiraj et al. | |
| 5,838,514 A | 11/1998 | Smith et al. | |
| 5,999,360 A | 12/1999 | Meyer et al. | |
| 6,052,249 A | 4/2000 | Abraham et al. | |
| 6,088,176 A | 7/2000 | Smith et al. | |
| 6,188,531 B1 | 2/2001 | Chang et al. | |
| 6,452,735 B1 * | 9/2002 | Egan et al. | 360/31 |
| 6,603,617 B1 * | 8/2003 | Cross | 360/31 |
| 6,671,111 B2 * | 12/2003 | Ottesen et al. | 360/31 |
| 6,683,737 B2 * | 1/2004 | Gong et al. | 360/31 |

* cited by examiner

*Primary Examiner*—David Hudspeth
*Assistant Examiner*—Dan I Davidson
(74) *Attorney, Agent, or Firm*—Chambliss, Bahner & Stophel, P.C.; David W. Lynch (57) ABSTRACT

A method and apparatus for predicting write failure resulting from flying height modulation and initiating re-writing of data upon occurrence of the predicted write failure is disclosed. According to the present invention, if the slider or transducer flying height modulates during the write process, such modulation is detected, and a rewrite of the same data is forced. A write reassign may be initiated when a thermal signal exceeding the predetermined threshold is detected during the rewrite and/or a read/verify may be initiated after the rewrite.

31 Claims, 6 Drawing Sheets

METHOD AND APPARATUS FOR PREDICTING WRITE FAILURE RESULTING FROM FLYING HEIGHT MODULATION

BACKGROUND OF THE INVENTION

1. Field of the Invention

This invention relates in general to storage systems, and more particularly to a method and apparatus for predicting write failure resulting from flying height modulation and initiating re-writing of data upon occurrence of the predicted write failure.

2. Description of Related Art

Modern computers require media in which digital data can be quickly stored and retrieved. Magnetizable (hard) layers on disks have proven to be a reliable media for fast and accurate data storage and retrieval. Disk drives that read data from and write data to hard disks have thus become popular components of computer systems. In such devices, read-write heads are used to write data on or read data from an adjacently rotating hard or flexible disk.

Existing magnetic storage systems use magnetoresistive (MR) heads to read data from magnetic media and to write data onto magnetic media. MR disk drives use a rotatable disk with concentric data tracks containing the user data, a read/write head that may include an inductive write head and an MR read head for writing and reading data on the various tracks, a data readback and detection channel coupled to the MR head for processing the data magnetically recorded on the disk, an actuator connected to a carrier for the head for moving the head to the desired data track and maintaining it over the track centerline during read or write operations.

There are typically a plurality of disks stacked on a hub that is rotated by a disk drive spindle motor. A housing supports the drive motor and head actuator and surrounds the head and disk to provide a substantially sealed environment for the head-disk interface. The head carrier is typically an air-bearing slider that rides on a bearing of air above the disk surface when the disk is rotating at its operational speed. The slider is maintained in very close proximity to the disk surface by a relatively fragile suspension that connects the slider to the actuator. The spacing between the slider and the disk surface is called the flying height and its precise value is critical to the proper function of the reading and writing process.

The inductive write head and MR read head are patterned on the trailing end of the slider, which is the portion of the slider that flies closest to the disk surface. The slider is either biased toward the disk surface by a small spring force from the suspension, or is "self-loaded" to the disk surface by means of a "negative-pressure" air-bearing surface on the slider.

The MR sensor detects magnetic field signals through the resistance changes of a magnetoresistive element, fabricated of a magnetic material, as a function of the strength and direction of magnetic flux being sensed by the element. MR sensors have application in magnetic recording systems because recorded data can be read from a magnetic medium when the external magnetic field from the recorded magnetic medium (the signal field) causes a change in the direction of magnetization in an MR read head. This in turn causes a change in electrical resistance in the MR read head and a corresponding change in the sensed current or voltage. The conventional MR sensor used in magnetic recording systems operates on the basis of the anisotropic magnetoresistive (AMR) effect in which a component of the element resistance varies as the square of the cosine of the angle between the magnetization in the element and the direction of sense or bias current flow through the element.

A different and more pronounced magnetoresistance, called giant magnetoresistance (GMR), has been observed in a variety of magnetic multilayered structures, the essential feature being at least two ferromagnetic metal layers separated by a nonferromagnetic metal layer. The physical origin is the same in all types of GMR structures: the application of an external magnetic field causes a variation in the relative orientation of the magnetizations of neighboring ferromagnetic layers. This in turn causes a change in the spin-dependent scattering of conduction electrons and thus the electrical resistance of the structure. The resistance of the structure thus changes as the relative alignment of the magnetizations of the ferromagnetic layers changes. A particularly useful application of GMR is a sandwich structure comprising two essentially uncoupled ferromagnetic layers separated by a non-magnetic metallic spacer layer in which the magnetization of one of the ferromagnetic layers is "pinned", and thus prevented from rotating in the presence of an external magnetic field. This type of MR sensor is called a "spin valve" sensor. U.S. Pat. Nos. 5,159,513 and 5,206,590, commonly assigned to the assignee of the present invention, describe MR spin valve sensors for use as MR read heads in magnetic recording data storage systems.

The read-write heads have been designed so that they will fly over the surface of the rotating disk at a very small, though theoretically constant distance above the disk. The separation between the read-write head and the disk is called the flying height, and is maintained by a film of air. The flying height is critical to proper function during reading and writing. If the flying height is too high during read, the read head will not be able to resolve the fine detail of the magnetic signal, thereby resulting in undecipherable data. Similarly, if the flying height is too high during a write, the magnetic flux lines that intersect the plane of the disk surface become weaker, thereby leading to loss of resolution. It is known that small solid or liquid contaminants inside the disk drive may collide with the head while it is either reading or writing, temporarily inducing substantial flying height increases. If this occurs during reading, the drive will detect the poor signal and initiate a recovery procedure, e.g., typically simply retrying the read. Because contamination collisions are transient events, the simple read retry is usually successful. However, if the flying height modulates during a write, today's drives do not detect that there is any problem at all. It is only after this poorly written data is read back that a problem is discovered. Poorly written data cannot be deciphered even when read under perfect ideal conditions, so by this time it is too late to recover.

During flight, the head undergoes continuous vibration, pitch and roll as the topography of the disk changes beneath the head. In a conventional hard disk device, heat is produced by the MR head due to its normal current bias. This heat is dissipated by the cooler disk. Because the film of air separating the head and the disk is of a thermally insulating nature, the amount of heat dissipation from the head depends upon flying height. An increase in the flying height due to modulation will cause the temperature to rise in the MR sensor. This increases the resistance of the MR head and can be detected as a low-frequency blip in the voltage output from the MR head. This is the definition of the thermal signal.

If the flying height modulates during the write process, the write head may fail to write the data properly. The modulation will affect the higher frequency component of the write signal more than the low frequency components. Thus, when this poorly written data is read back, the resulting signal will consist of a low-frequency modulation envelope with reduced amplitude in the high frequency signals. This high-frequency dropout will result in unrecoverable media errors when the data is attempted to be retrieved.

U.S. Pat. No. 5,751,510 to Smith, et al., which is commonly assigned to the assignee of the present applicant, and which is incorporated by this reference herein, discloses an apparatus and method for reading an information signal from a magnetic storage medium using a magnetoresistive (MR) element, modifying the signal such that a thermal component of the signal representing a thermal response of the MR element is degraded, and altering the modified signal to produce a restored thermal signal substantially representative of the thermal component of the information signal read from the storage medium. The restored thermal signal may be used to detect disk surface defects and topographic variations, and may be utilized for other systemic and diagnostic purposes, including disk surface defect characterization, error correction, and predictive failure analysis. However, U.S. Pat. No. 5,751,510 does not disclose how to determine whether to initiate a re-write operation.

U.S. Pat. No. 6,088,176 to Smith, et al., which is commonly assigned to the assignee of the present applicant, and which is incorporated by this reference herein, discloses separating a thermal signal component and, if present, a magnetic signal component from the information signal. The magnetic signal is processed to remove the influence of the thermal signal component from the magnetic signal. According to U.S. Pat. No. 6,088,176, the magnetic and thermal signal components of a readback signal are respectively extracted and processed so as to linearly correspond to head-to-disk spacing. Head-to-disk spacing using the thermal signal may be used to detect disk surface defects and topographic variations. The thermal signal may be calibrated using a magnetic spacing signal in order to directly measure head-to-disk spacing change. The thermal head-to-disk spacing signal may be utilized for other systemic and diagnostic purposes, including defect characterization, error correction, and predictive failure analysis. However, U.S. Pat. No. 6,088,176 also fails to detect when a flying height modulation occurs during a writing and to determine when to initiate a re-write operation.

It can be seen then that there is a need for a method and apparatus for predicting write failure resulting from flying height modulation and initiating re-writing of data upon occurrence of the predicted write failure.

It can also be seen then that there is a need for a method and apparatus that will detect when such a modulation occurs and force a rewrite of the same data when necessary.

SUMMARY OF THE INVENTION

To overcome the limitations in the prior art described above, and to overcome other limitations that will become apparent upon reading and understanding the present specification, the present invention discloses a method and apparatus that will detect when a flying height modulation occurs during a writing, and will force a rewrite of the same data when necessary.

The present invention solves the above-described problems by predicting write failure resulting from flying height modulation and initiating re-writing of data upon occurrence of the predicted write failure.

A system in accordance with the principles of the present invention includes a processor for controlling a write operation and for receiving a thermal signal, wherein the processor compares the thermal signal to a predetermined threshold to determine whether to initiate a re-write operation.

Other embodiments of a system in accordance with the principles of the invention may include alternative or optional additional aspects. One such aspect of the present invention is that the processor initiates the re-write operation when the thermal signal exceeds the predetermined threshold.

Another aspect of the present invention is that the thermal signal may indicate a flying height variation for a transducer.

Another aspect of the present invention is that the thermal signal may be a bandpass filtered signal that is tuned to the air bearing resonant frequencies associated with a predetermined drive design.

Another aspect of the present invention may be that the thermal signal exceeding the predetermined threshold indicates a flying height variation that will cause the higher frequency components in a signal written to media to become attenuated resulting in unrecoverable errors when reading the written signal.

Another aspect of the present invention may be that the processor initiates a write reassign when a thermal signal exceeding the predetermined threshold is detected during the rewrite.

Another aspect of the present invention may be that the processor initiates a read/verify after the rewrite.

In another embodiment of the present invention, a disk drive is disclosed. The disk drive includes a processor for controlling reading and writing of data on a data recording medium, a write channel for processing write signals for recording on the data recording medium and a read channel for reading data from the data recording medium and for providing a thermal signal representing flying height variation, wherein the processor compares the thermal signal to a predetermined threshold to determine whether to initiate a re-write operation.

Another aspect of the disk drive of the present invention may be that the processor initiates the re-write operation when the thermal signal exceeds the predetermined threshold.

Another aspect of the disk drive of the present invention may be that the thermal signal indicates a flying height variation for a transducer.

Another aspect of the disk drive of the present invention may be that the thermal signal is a bandpass filtered signal that is tuned to the air bearing resonant frequencies associated with a predetermined drive design.

Another aspect of the disk drive of the present invention may be that the thermal signal exceeding the predetermined threshold indicates a flying height variation that will cause the higher frequency components in a signal written to media to become attenuated resulting in unrecoverable errors when reading the written signal.

Another aspect of the disk drive of the present invention may be that the processor initiates a write reassign when a thermal signal exceeding the predetermined threshold is detected during the rewrite.

Another aspect of the disk drive of the present invention may be that the processor initiates a read/verify after the rewrite.

In another embodiment of the present invention, a method for predicting write failure resulting from flying height modulation is provided. The method includes initiating a write operation for writing data to a recording medium, monitoring a read channel during the write operation, comparing a thermal signal from the read channel to a predetermined threshold and re-writing the data if the thermal signal exceeds the predetermined threshold.

Another aspect of the method of the present invention may be that the thermal signal indicates a flying height variation for a transducer.

Another aspect of the method of the present invention may be that the thermal signal is a bandpass filtered signal that is tuned to the air bearing resonant frequencies associated with a predetermined drive design.

Another aspect of the method of the present invention may be that the thermal signal exceeding the predetermined threshold indicates a flying height variation that will cause the higher frequency components in a signal written to the medium to become attenuated resulting in unrecoverable errors when reading the written signal.

Another aspect of the method drive of the present invention may be that the method further includes continuing the write operation when the thermal signal does not exceed the predetermined threshold.

Another aspect of the method of the present invention may be that a write reassign is initiated when a thermal signal exceeding the predetermined threshold is detected during the rewrite.

Another aspect of the method of the present invention may be that a read/verify is initiated after the rewrite.

In another embodiment of the present invention, an article of manufacture includes a program storage medium readable by a computer, the medium tangibly embodying one or more programs of instructions executable by the computer to perform a method for predicting write failure resulting from flying height modulation, wherein the method includes initiating a write operation for writing data to a recording medium, monitoring a read channel during the write operation, comparing a thermal signal from the read channel to a predetermined threshold and re-writing the data if the thermal signal exceeds the predetermined threshold.

In another embodiment of the present invention, a disk drive for recording data on a recording medium is disclosed. The disk drive includes processor means for controlling reading and writing of data on a data recording medium, write channel means for processing write signals for recording on the data recording medium and read channel means for reading data from the data recording medium and for providing a thermal signal representing flying height variation, wherein the processor means compares the thermal signal to a predetermined threshold to determine whether to initiate a re-write operation.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for predicting write failure resulting from flying height modulation and initiating re-writing of data upon occurrence of the predicted write failure. If the slider or transducer modulates during the write process, the write head may fail to write the data properly. The modulation will affect the higher frequency component of the write signal more than the low frequency components. Thus, the resulting readback signal will consist of low frequency modulation envelope with dropout or attenuation in the high frequency signals. The high frequency dropout will result in unrecoverable errors (hard errors). However, according to the present invention, if such a modulation occurs, it is detected, and a rewrite of the same data is forced.

Figure 1:
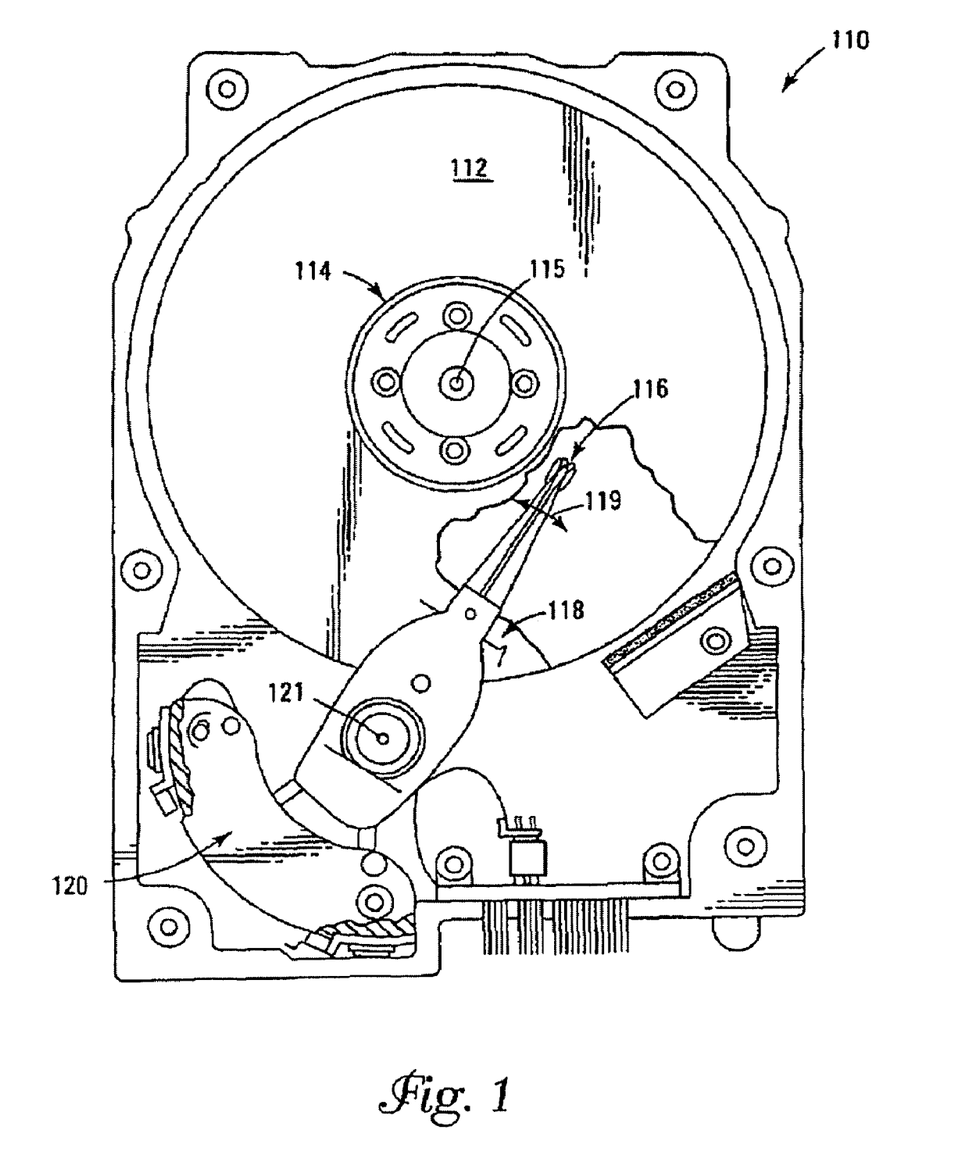
FIG. 1 is a plan view of a disk drive.

FIG. 1 is a plan view of a disk drive 100. Disk drive 100 includes a disk pack 112, which is mounted on a spindle motor (not shown) by a disk clamp 114. Disk pack 112, in one preferred embodiment, includes a plurality of individual disks that are mounted for co-rotation about a central axis 115. Each disk surface on which data is stored has an associated head gimbal assembly (HGA) 116, which is mounted to at least one actuator assembly 118 in disk drive 100. An actuator assembly as shown in FIG. 1 is of the type known as a rotary moving coil actuator and includes a voice coil motor (VCM) shown generally at 120. A voice coil motor 120 rotates an actuator assembly 118 with its attached HGAs 116 about a pivot axis 121 to position HGAs 116 over desired data tracks on the associated disk surfaces, under the control of electronic circuitry housed within disk drive 100.

More specifically, an actuator assembly 118 pivots about axis 121 to rotate head gimbal assemblies 116 generally along an arc 119 which causes each head gimbal assembly 116 to be positioned over a desired one of the tracks on the surfaces of disks in disk pack 112. HGAs 116 can be moved from tracks lying on the innermost radius, to tracks lying on the outermost radius of the disks. Each head gimbal assembly 116 has a gimbal, which resiliently supports a slider relative to a load beam so that the slider can follow the topography of the disk. The slider, in turn, includes a transducer that is utilized for encoding flux reversals on, and reading flux reversals from, the surface of the disk over which it is flying.

Figure 2:
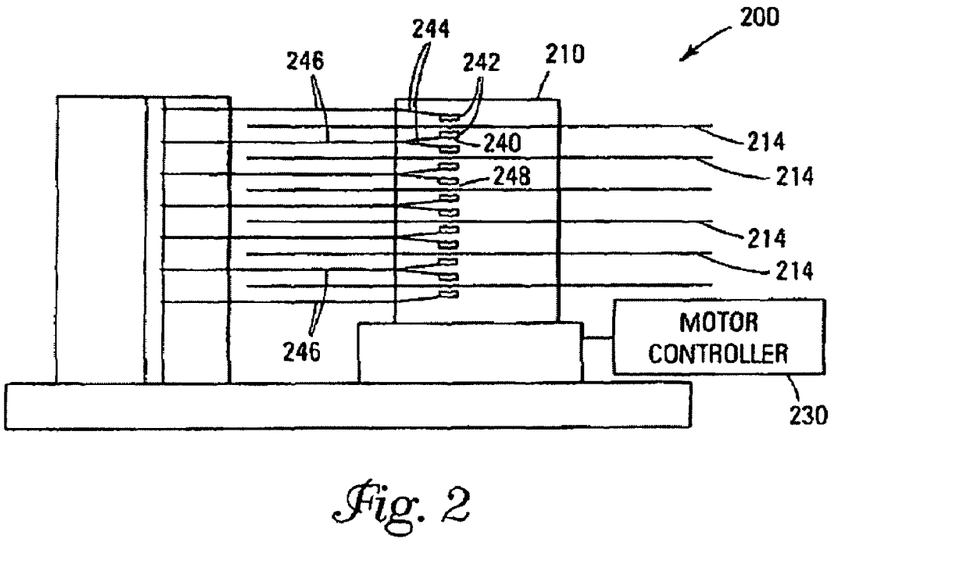
FIG. 2 illustrates one particular embodiment of a storage system according to the present invention.

FIG. 2 illustrates one particular embodiment of a storage system 200 according to the present invention. In FIG. 2, a hard disk drive 200 is shown. The drive 200 includes a spindle 210 that supports and rotates a magnetic disk 214. The spindle 210 is rotated by a motor 220 that is controlled by a motor controller 230. A combined read and write magnetic head 240 is mounted on a slider 242 that is supported by a suspension 244 and actuator arm 246. Processing circuitry 250 exchanges signals, representing such information, with the head 240, provides motor drive signals for rotating the magnetic disk 214, and provides control signals for moving the slider to various tracks. A plurality of disks 214, sliders 242 and suspensions 244 may be employed in a large capacity direct access storage device (DASD).

The suspension 244 and actuator arm 246 position the slider 242 so that the magnetic head 240 is in a transducing relationship with a surface of the magnetic disk 214. When the disk 214 is rotated by the motor 220 the slider 240 is supported on a thin cushion of air (air bearing) between the surface of the disk 214 and the air bearing surface (ABS) 248. The magnetic head 240 may then be employed for writing information to multiple circular tracks on the surface of the disk 214, as well as for reading information therefrom.

Figure 3:
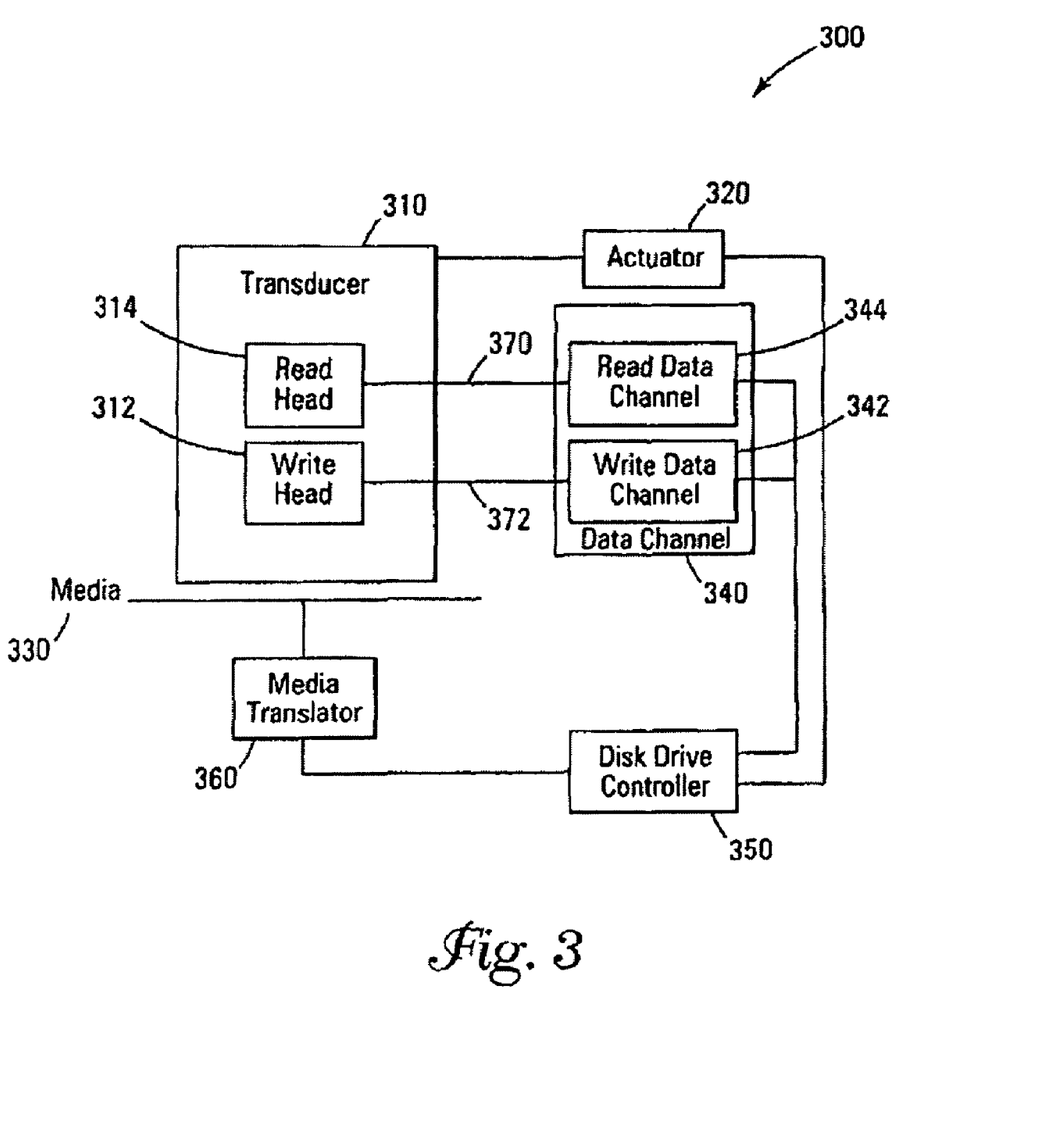
FIG. 3 illustrates a storage system according to the present invention.

FIG. 3 illustrates a storage system 300 according to the present invention. In FIG. 3, a transducer 310 is under control of an actuator 320. The actuator 320 controls the position of the transducer 310. The transducer 310 includes a write head 312 and a read head 314 for writing and reading data on magnetic media 330. The read/write signals are passed to a data channel 340. The data channel 340 includes a write data channel 342 for providing write current to the write head to record the data on media 330. The data channel 340 also includes a read channel 344 for processing the read-channel signals and making the results available to the disk drive controller 350.

The disk drive controller 350 controls the actuator 320 and processes the signals of the data channels 340. For example, the controller 350 may be used to bandpass filter the thermal signal 370 from the read channel to tune the thermal signal to the air bearing resonant frequencies associated with a predetermined drive design. However, those skilled in the art will recognize that the present invention is not meant to be limited to bandpass filtering of the thermal signal 370 by the controller.

In addition, a media translator 360 is controlled by the disk drive controller 350 to cause the magnetic media 330 to move relative to the transducer 310. The present invention is not meant to be limited to a particular type of storage system 300 or to the type of media 330 used in the storage system 300. Moreover, the data channel is understood to include a channel module and/or intelligent circuitry in the arm electronics (AE).

If the flying height of the transducer 310 modulates during the write process, the write head 312 may fail to write the data to the media 330 properly. The modulation will affect the higher frequency component of the write signal more than the low frequency components. Thus, the resulting readback signal will include a low frequency modulation envelope with dropout or attenuation in the high frequency signals. The high frequency dropout will result in unrecoverable errors (hard errors).

However, according to the present invention, the disk drive controller 350, for example, will detect the occurrence of such modulation and force a rewrite of the same data when necessary. To detect modulation in the flying height of the transducer 310, the thermal signal 370 of the read head 314 is monitored via the read channel 344 while the write signal 372 is written to the media 330 by the write head 312. Flying height is a measurement of the separation between the media 330 and the transducer 310. If the amplitude of the thermal signal 370 is determined to be greater than a predetermined threshold then the write data can be re-written.

Figure 4:
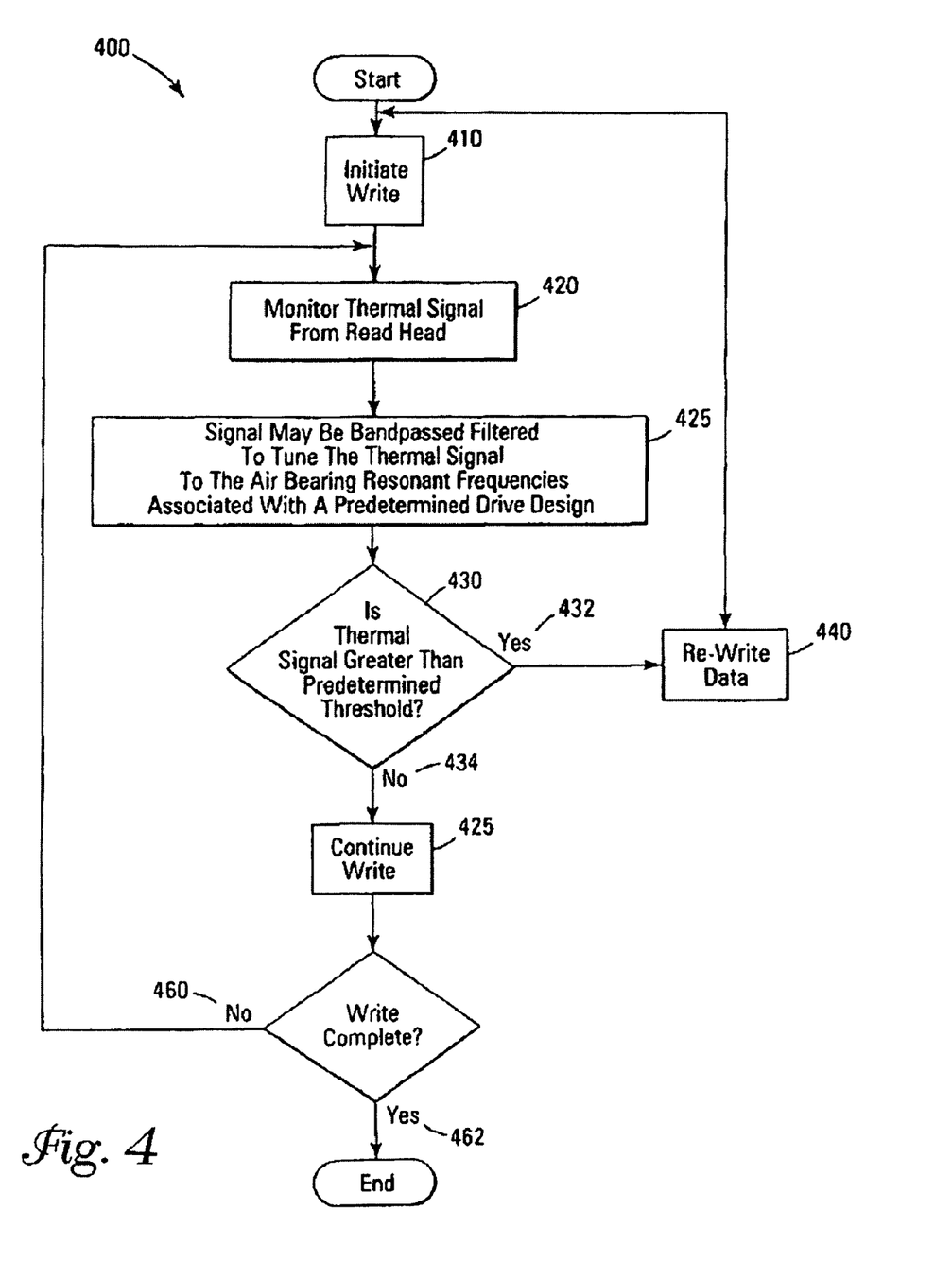
FIG. 4 is a flow chart of the method for predicting write failure resulting from flying height modulation according to the present invention.

FIG. 4 illustrates a flow chart 400 of the method for predicting write failure resulting from flying height modulation according to the present invention. In FIG. 4, a write operation is initiated 410. The read channel is monitored during the write operation 420. A thermal signal from the read channel may be bandpassed filtered to tune the thermal signal to the air bearing resonant frequencies associated with a predetermined drive design 425. The signal is then compared to a predetermined threshold 430. If the thermal signal exceeds the predetermined threshold 432, then the data is rewritten 440 because a flying height modulation that causes high frequency dropout in the write signal was indicated by the thermal signal exceeding the predetermined threshold. If the thermal signal does not exceed the predetermined threshold 434, then the write continues 450. The write continues 460 until completed 462 or it is determined that the thermal signal exceeds the predetermined threshold 432.

If the thermal signal indicates a flying height modulation, the same data may be rewritten 440 at a spare location and the address of the block updated to the spare location, i.e., a write reassign. This may be unnecessary the first time through, but if the thermal signal occurs again during the re-write, the write reassign would be advisable. For example, there might be some embedded disk defect in the original location that causes the modulation.

Figure 5:
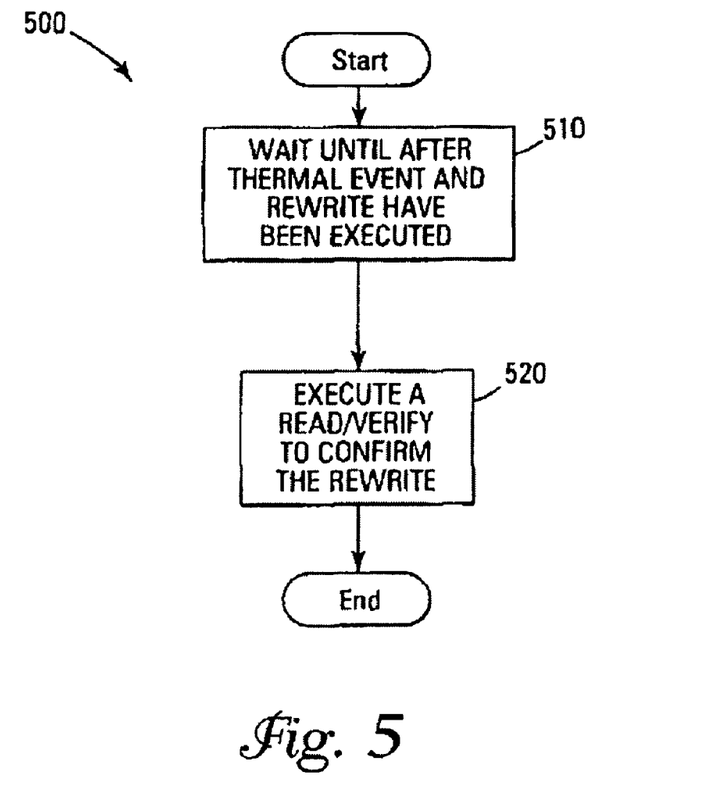
FIG. 5 illustrates another embodiment of the present invention showing an additional aspect that may be implemented.

FIG. 5 illustrates another embodiment of the present invention showing an additional aspect 500 that may be implemented. The process may wait until after the occurrence of any thermal signal event and after the forced rewrite has been executed 510. Then, a read/verify of the rewritten data may be performed to ensure the rewrite was written correctly, even when the thermal signal is acceptable during the rewrite 520. Such a procedure consumes time and would degrade performance if it is executed too frequently. However, in a properly designed drive, such flying height modulation is not expected often. The read/verify thus would guarantee that the data was in fact written acceptably the second time. A read/verify could be performed after every single write. However, such an option would severely degrade file performance, i.e., essentially write command execution rates would be cut in half. Such degradation in file performance is an unacceptable burden. Thus, the present invention allows full speed writing by doing the flying height checking in parallel using the thermal signal from the MR head.

Figure 6:
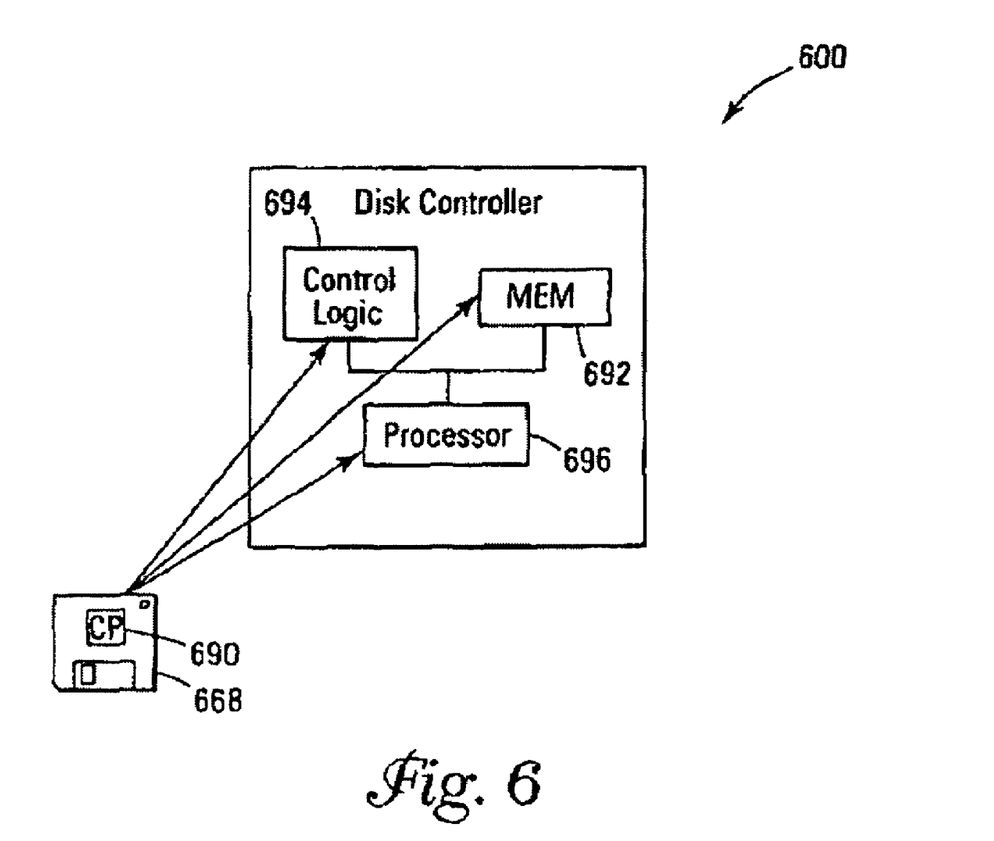
FIG. 6 illustrates a system according to the present invention, wherein the process illustrated with reference to FIGS. 3–5 may be tangibly embodied in a computer-readable medium or carrier.

FIG. 6 illustrates a system 600 according to the present invention, wherein the process illustrated with reference to FIGS. 3–5 may be tangibly embodied in a computer-readable medium or carrier, e.g. one or more of the fixed and/or removable data storage devices 668 illustrated in FIG. 6, or other data storage or data communications devices. A computer program 690 expressing the processes embodied on the removable data storage devices 668 may be loaded into the memory 692, control logic 694, the controller processor 696, etc., to configure the controller 600 of FIG. 6, for execution. The computer program 690 includes instructions which, when read and executed by the controller 600 of FIG. 6, cause the controller system 600 to perform the steps necessary to execute the steps or elements of the present invention The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A controller, comprising a processor for controlling a write operation and for receiving a thermal signal from a read channel, wherein the processor compares the thermal signal to a predetermined threshold to determine whether to initiate a re-write operation, wherein the thermal signal is a bandpass filtered signal that is tuned to the air bearing resonant frequencies associated with a predetermined drive design.

2. The controller of claim 1 wherein the processor initiates the re-write operation when the thermal signal exceeds the predetermined threshold.

3. The controller of claim 2 wherein the thermal signal indicates a flying height variation for a transducer.

4. The controller of claim 3 wherein the thermal signal exceeding the predetermined threshold indicates a flying height variation that will cause the higher frequency components in a signal written to media to become attenuated resulting in unrecoverable errors when reading the written signal.

5. The controller of claim 2 wherein the thermal signal exceeding the predetermined threshold indicates a flying height variation that will cause the higher frequency components in a signal written to media to become attenuated resulting in unrecoverable errors when reading the written signal.

6. The controller of claim 1 wherein the thermal signal indicates a flying height variation for a transducer.

7. The controller of claim 1 wherein the processor initiates a write reassign when a thermal signal exceeding the predetermined threshold is detected during the rewrite.

8. The controller of claim 1 wherein the processor initiates a read/verify after the rewrite.

9. A disk drive, comprising:
a processor for controlling reading and writing of data on a data recording medium;
a write channel for processing write signals for recording on the data recording medium; and
a read channel for reading data from the data recording medium and for providing a thermal signal representing flying height variation;
wherein the processor compares the thermal signal to a predetermined threshold to determine whether to initiate a re-write operation, and wherein the thermal signal is a bandpass filtered signal that is tuned to the air bearing resonant frequencies associated with a predetermined drive design.

10. The disk drive of claim 9 wherein the processor initiates the re-write operation when the thermal signal exceeds the predetermined threshold.

11. The disk drive of claim 10 wherein the thermal signal indicates a flying height variation for a transducer.

12. The disk drive of claim 11 wherein the thermal signal exceeding the predetermined threshold indicates a flying height variation that will cause the higher frequency components in a signal written to media to become attenuated resulting in unrecoverable errors when reading the written signal.

13. The disk drive of claim 10 wherein the thermal signal exceeding the predetermined threshold indicates a flying height variation that will cause the higher frequency components in a signal written to media to become attenuated resulting in unrecoverable errors when reading the written signal.

14. The disk drive of claim 9 wherein the thermal signal indicates a flying height variation for a transducer.

15. The disk drive of claim 9 wherein the processor initiates a write reassign when a thermal signal exceeding the predetermined threshold is detected during the rewrite.

16. The disk drive of claim 9 wherein the processor initiates a read/verify after the rewrite.

17. A method for predicting write failure resulting from flying height modulation, comprising:
initiating a write operation for writing data to a recording medium;
monitoring a read channel during the write operation;
comparing a thermal signal from the read channel to a predetermined threshold;
re-writing the data if the thermal signal exceeds the predetermined threshold; and
bandpass filtering the thermal signal such that the bandpass filtered signal is tuned to the air bearing resonant frequencies associated with a predetermined drive design.

18. The method of claim 17 wherein the thermal signal indicates a flying height variation for a transducer.

19. The method of claim 18 wherein the thermal signal exceeding the predetermined threshold indicates a flying height variation that will cause the higher frequency components in a signal written to the medium to become attenuated resulting in unrecoverable errors when reading the written signal.

20. The method of claim 17 wherein the thermal signal exceeding the predetermined threshold indicates a flying height variation that will cause the higher frequency components in a signal written to medium to become attenuated resulting in unrecoverable errors when reading the written signal.

21. The method of claim 17 further comprising continuing the write operation when the thermal signal does not exceed the predetermined threshold.

22. The method of claim 17 further comprising initiating a write reassign when a thermal signal exceeding the predetermined threshold is detected during the rewrite.

23. The method of claim 17 further comprising initiating a read/verify after the rewrite.

24. An article of manufacture comprising a program storage medium readable by a computer, the medium tangibly embodying one or more programs of instructions executable by the computer to perform a method for predicting write failure resulting from flying height modulation, the method comprising:
initiating a write operation for writing data to a recording medium;
monitoring a read channel during the write operation;
comparing a thermal signal from the read channel to a predetermined threshold; and
re-writing the data if the thermal signal exceeds the predetermined threshold;
wherein the thermal signal is a bandpass filtered signal that is tuned to the air bearing resonant frequencies associated with a predetermined drive design.

25. The article of manufacture of claim 24 wherein the thermal signal indicates a flying height variation for a transducer.

26. The article of manufacture of claim 25 wherein the thermal signal exceeding the predetermined threshold indicates a flying height variation that will cause the higher frequency components in a signal written to the medium to become attenuated resulting in unrecoverable errors when reading the written signal.

27. The article of manufacture of claim 24 wherein the thermal signal exceeding the predetermined threshold indicates a flying height variation that will cause the higher frequency components in a signal written to medium to become attenuated resulting in unrecoverable errors when reading the written signal.

28. The article of manufacture of claim 24 further comprising continuing the write operation when the thermal signal does not exceed the predetermined threshold.

29. The article of manufacture of claim 24 further comprising initiating a write reassign when a thermal signal exceeding the predetermined threshold is detected during the rewrite.

30. The article of manufacture of claim 24 further comprising initiating a read/verify after the rewrite.

31. A disk drive, comprising:

processor means for controlling reading and writing of data on a data recording medium;

write channel means for processing write signals for recording on the data recording medium; and read channel means for reading data from the data recording medium and for providing a thermal signal representing flying height variation;

wherein the processor means compares the thermal signal to a predetermined threshold to determine whether to initiate a re-write operation and wherein the thermal signal is a bandpass filtered signal that is tuned to the air bearing resonant frequencies associated with a predetermined drive design.

\* \* \* \* \*